Nov. 18, 1958     R. C. RISNER     2,860,910
AUTOMOBILE CARRIERS

Filed Sept. 11, 1956     2 Sheets-Sheet 1

INVENTOR
ROBERT C. RISNER

Ogle R. Singleton

ATTORNEY

Nov. 18, 1958  R. C. RISNER  2,860,910
AUTOMOBILE CARRIERS
Filed Sept. 11, 1956  2 Sheets-Sheet 2

INVENTOR
ROBERT C. RISNER
BY Ogle P. Singleton
ATTORNEY

# United States Patent Office 2,860,910
Patented Nov. 18, 1958

2,860,910

AUTOMOBILE CARRIERS

Robert C. Risner, Towson, Md.

Application September 11, 1956, Serial No. 609,125

3 Claims. (Cl. 296—1)

My invention consists in a new and useful improvement in automobile carriers and constitutes a considerable improvement over the carrier disclosed and claimed in my co-pending application, Serial Number 596,006.

The tendency in automobile designing to increase the body-length of new models led to my conception of the hereinafter disclosed improvements to produce a trailer capable of carrying five automobiles having greater body-lengths than heretofore, without having to increase the dimensions of the trailer which are quite strictly limited by highway regulations.

The improved features hereinafter fully disclosed are: (1) a sectional intermediate trackway having a hinged portion whereby one of the loaded cars can be tipped to depress one of its ends; and (2) a removable bridge which can be spaced closely above the depressed end, with a pair of skids hinged on the intermediate trackway and extensible to the bridge for loading one of the cars.

While I have illustrated in the drawings and hereinafter fully described one specific embodiment of my invention, it is to be distinctly understood that I do not consider my invention to be limited to said embodiment but refer for its scope to the claims appended hereto.

Figure 1:
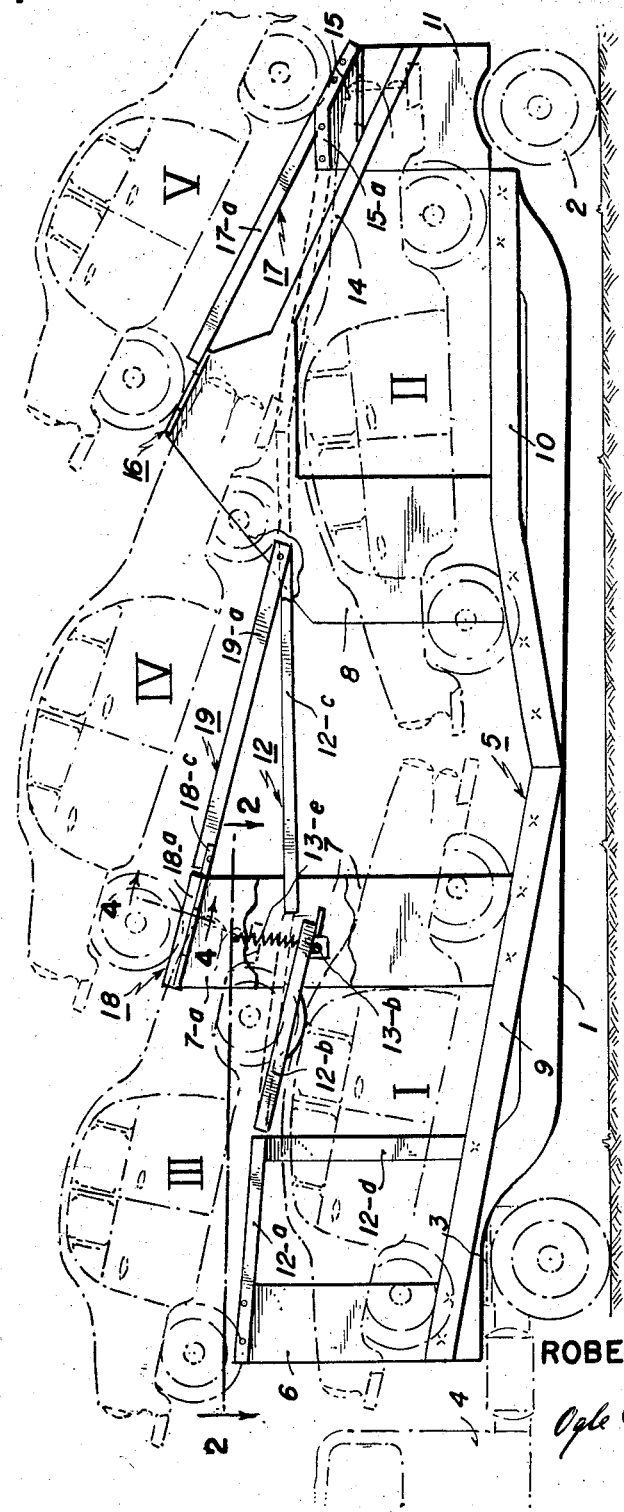
Fig. 1 is a side elevation of my improved trailer fully loaded with five cars, viz. two large-size cars and three standard-size cars, the tractor for the trailer and the loaded cars being shown in broken lines, and small portions of the trailer being broken away.

As shown in the drawings, my improved trailer has a base comprising a pair of longitudinal side beams 1 connected at their ends by transverse beams (not shown) supported at its rear end by ground wheels 2 and at its forward end by the usual coupling 3 of the tractor 4. It will be noted (Fig. 1) that the beams 1 are so configured that the trailer is underslung between the wheels 2 and the coupling 3. Suitably mounted on the beams 1, there is a lower trackway 5. Suitably mounted on the base there are two sets of pillars 6, 7 and 8 on the sides of the trackway 5, respectively. Longitudinal ribs 9 and 10 are provided for the pillars. Suitably mounted on the base above the wheels 2 are side walls 11.

Figure 2:
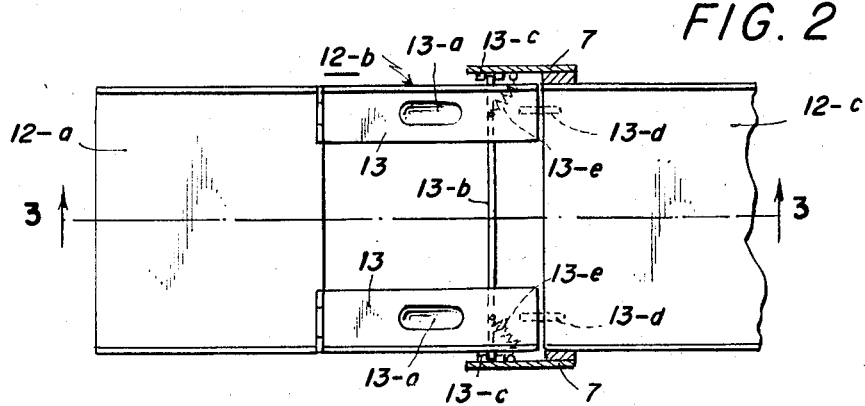
Fig. 2 is a fragmentary top plan of the trailer as viewed on line 2—2 of Fig. 1, in the direction of the arrows.
Figure 3:
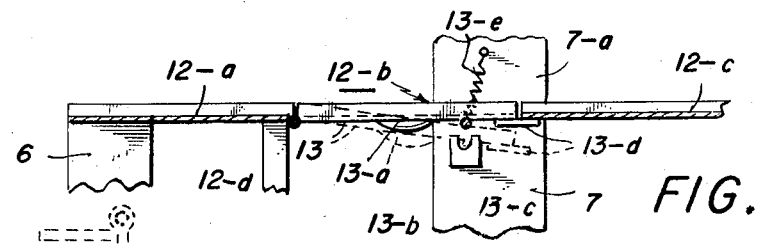
Fig. 3 is a vertical section on the line 3—3 of Fig. 2, in the direction of the arrows.

I provide an intermediate trackway 12 comprising a fixed portion 12–a, a hinged portion 12–b and a second fixed portion 12–c. The portion 12–a is suitably mounted on the two pillars 6 and a pair of posts 12–d suitably mounted on the base. The portion 12–b comprises a pair of tracks 13 which are hinged to the rear end of the portion 12–a (Figs. 2 and 3) immediately aft of the posts 12–d, and have wheel wells 13–a. These tracks 13 are connected at their rear ends by a transverse rod 13–b which extends laterally of the tracks 13 so that its ends are received in sockets 13–c on the inner faces of pillars 7, when the tracks 13 are depressed. Each track 13 has a finger 13–d on its rear end projecting from its under-face rearwardly under the forward end of portion 12–c. These tracks 13 are biased upwardly by coil springs 13–e mounted on the rod 13–b and pillars 7, to hold the fingers 13–d against the bottom of the portion 12–c in order to normally register the portion 12–b with the portion 12–c. The portion 12–c is suitably mounted on the pillars 7 and 8. Struts 14 connect the pillars 8 with the walls 11.

A gate 15 is removably mounted on the upper ends of the walls 11 and may have the form and function of the gate described in my said co-pending application, Serial Number 596,006.

Suitably hinged on the upper end of one of the struts 14 there is a bridge 16 provided with means for removably fastening its free end to the upper end of the other strut 14.

I provide a pair of skids 17 adapted to alternatively connect the gate 15 with the bridge 16 and the gate 15 with the rear end of the portion 12–c of the intermediate trackway 12. The skids 17 have lateral upstanding flanges 17–a which can be fastened to the flanges 15–a of the gate 15, by pins, as clearly shown in my said co-pending application, Serial Number 596,006.

Suitable skids (not shown) can be used to extend from the ground on which stands the trailer, alternatively to the lower trackway 5 and to the rear ends of the skids 17, as shown in my said co-pending application, Serial Number 596,006.

The pillars 7 are provided with portions 7–a rising above the intermediate trackway 12. Suitably hinged on the upper end of one of these portions 7–a there is a bridge 18 provided with means for removably fastening its free end to the upper end of the other portion 7–a. The bridge 18 has lateral upstanding flanges 18–a, an upwardly curved middle portion 18–b, and two pairs of rearwardly projecting ears 18–c. I provide a pair of skids 19 hinged on the portion 12–c of the intermediate trackway 12 and having upstanding lateral flanges 19–a which can be removably attached to the ears 18–c by pins as shown in my said co-pending application, Serial Number 596,006.

Figure 4:
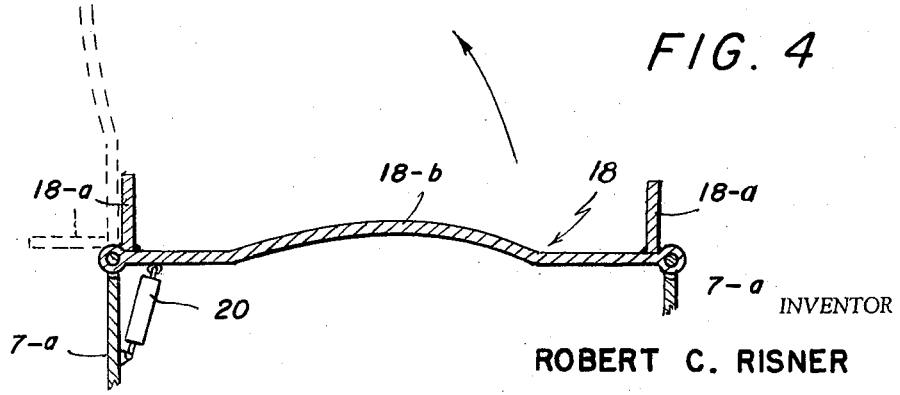
Fig. 4 is an enlarged vertical section on the line 4—4 of Fig. 1, in the direction of the arrows.

The bridge 18 may be mechanically opened and closed by any suitable means, such as a pneumatic jack 20 as illustrated in Fig. 4.

Having described the structural details of my improved trailer, I will now describe its use and operation.

It is to be understood that all five cars are loaded on the trailer by being backed into the rear end of the trailer. Cars I and II are loaded on the lower trackway 5, car III on the forward fixed portion 12–a and the hinged portion 12–b, of the intermediate trackway 12, car IV on the portion 12–c of the trackway 12 and the bridge 18, and car V on the skids 17 and the bridge 16.

To load cars I and II, the gate 15 and the bridges 16 and 18 are opened. The cars are then backed on trackway 5 and positioned as shown in Fig. 1.

To load car III, the gate 15 is closed and skids 17 are placed to connect the gate 15 with the intermediate trackway 12. Car III is then backed up on gate 15 and along trackway 12, passing over the skids 19 which are prone on trackway 12. When the rear wheels of car III pass off of the forward end of the portion 12–c, they depress the tracks 13 which are retained in depressed position by the rod 13–b in keepers 13–c, expanding the springs 13–e. When the rear wheels pass forwardly into and out of the wheel wells 13–a and off of the tracks 13, the tracks 13 are returned to normal position by the springs 13–e and so retained by the fingers 13–d. Further movement of car III causes its front wheels to pass onto the tracks 13 which are thereby depressed, and the front wheels rest in the wheel wells 13–a, car III being properly positioned as desired.

It will be noted (Fig. 1) that, when the tracks 13 are depressed (loaded position), the bottoms of the wheels wells 13–a are spaced a proper distance above the roof of car I.

Car III can be positioned, as shown in Fig. 1, by the utilization of my improved removable stops described in my said co-pending application, Serial Number 596,006. Should it be desired to load a large-size car, at the forward end of the intermediate trackway 12, this can be done by using my improved auxiliary trackway shown in my co-pending application, Serial Number 491,391.

To load car IV, the bridge 18 is closed and the forward ends of the skids 19 are raised from the trackway 12 and fastened to the bridge 18. Car IV is then backed up onto the gate 15 and along skids 17, intermediate trackway 12 and skids 19, into desired position, its rear wheels resting on the bridge 18 and its front wheels on the trackway 12.

It is to be particularly noted that by reason of the depression of the front wheels of car III in wheel wells 13–a in the hinged tracks 13 which are depressed and the curved portion 18–b of the bridge 18 over the curved hood of car III, both cars III and IV are positioned at the minimum height above the ground level, while ample clearance between the cars is provided.

To load car V, the bridge 16 is closed and the skids 17 are moved to connect the gate 15 with the bridge 16. Car V is then backed up onto gate 15 and along skids 17, into desired position, its rear wheels resting on the bridge 16 and its front wheels resting on the skids 17 above the gate 15.

It is to be particularly noted that, when cars III, IV and V have been loaded, the wheels of these cars are disposed substantially above the members rising from the base of the trailer to support the intermediate trackway, the bridges and the gate. It is obvious that such relation of the elements of the trailer serves to afford maximum strength for the structure.

Having described my invention, what I claim is:

1. In an automobile carrier, the combination of a lower trackway adapted to carry two automobiles; an upper trackway adapted to carry a third automobile; a pivotally mounted bridge member spaced above said upper trackway for receiving one set of wheels of a fourth automobile; a pair of removable skids connecting said upper trackway and said bridge for passage of said fourth automobile to said bridge; a second pivotally mounted bridge member spaced above said upper trackway for receiving one set of wheels of a fifth automobile; and a second pair of skids removably connecting said upper trackway with said second bridge member for passage of said fifth automobile to said second bridge.

2. An automobile carrier, according to claim 1, in which said upper trackway has two fixed portions and a hinged portion therebetween, said hinged portion being biased into normal position to register with said fixed portions, and being adapted to swing downwardly to depress one end of said automobile carried by said upper trackway.

3. An automobile carrier, according to claim 1, in which said upper trackway has two fixed portions and a movable portion therebetween comprising a pair of tracks hinged to one of said fixed portions, and adapted to swing downwardly to depress one end of said automobile carried by said upper trackway.

References Cited in the file of this patent

UNITED STATES PATENTS

| | | |
|---|---|---|
| 2,750,225 | Mettetal | June 12, 1956 |
| 2,766,898 | Risner | Oct. 16, 1956 |